US012277423B2

(12) United States Patent
Huang et al.

(10) Patent No.: US 12,277,423 B2
(45) Date of Patent: Apr. 15, 2025

(54) PROCESSOR CONTROL METHOD AND ASSOCIATED SYSTEM-ON-CHIP

(71) Applicant: SigmaStar Technology Ltd., Fujian (CN)

(72) Inventors: Cheng-Chi Huang, Hsinchu (CN); Shu-Cheng Chou, Hsinchu (CN); Yu-Hsiang Lin, Hsinchu (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 41 days.

(21) Appl. No.: 18/184,107

(22) Filed: Mar. 15, 2023

(65) Prior Publication Data

US 2024/0126559 A1    Apr. 18, 2024

(30) Foreign Application Priority Data

Oct. 13, 2022    (CN) .......................... 202211255768.4

(51) Int. Cl.
*G06F 9/44*        (2018.01)
*G06F 9/4401*    (2018.01)

(52) U.S. Cl.
CPC ............ *G06F 9/441* (2013.01); *G06F 9/4418* (2013.01)

(58) Field of Classification Search
CPC .............................. G06F 9/441; G06F 9/4418
See application file for complete search history.

(56) References Cited

U.S. PATENT DOCUMENTS

| 2011/0066836 | A1* | 3/2011 | Iguchi ................... G06F 9/4406 713/2 |
| 2013/0117762 | A1* | 5/2013 | Yamashita .............. G06F 9/485 719/313 |
| 2018/0308480 | A1* | 10/2018 | Jang ...................... G06F 3/0484 |
| 2020/0112292 | A1* | 4/2020 | Liang ..................... H03K 19/21 |
| 2020/0310808 | A1* | 10/2020 | Chen ....................... G06F 9/321 |
| 2022/0245515 | A1* | 8/2022 | Yi ........................ G06F 21/6245 |

* cited by examiner

*Primary Examiner* — Keshab R Pandey
(74) *Attorney, Agent, or Firm* — Edell, Shapiro & Finnan, LLC (57) ABSTRACT

The present invention discloses a processor control method including: controlling a processor to execute a first operating system in a first state; when the processor executing the first operating system satisfies a predetermined condition, controlling the processor to switch from the first state to a second state; and controlling the processor to execute a second operating system in the second state, wherein an authority of the first state is higher than an authority of the second state.

11 Claims, 9 Drawing Sheets

PROCESSOR CONTROL METHOD AND ASSOCIATED SYSTEM-ON-CHIP

This application claims the benefit of China application Serial No. CN202211255768.4, filed on Oct. 13, 2022, the subject matter of which is incorporated herein by reference.

BACKGROUND OF THE INVENTION

Field of the Invention

The present invention relates to a system-on-chip operable to execute two operating systems and a control method thereof.

Description of the Related Art

Embedded systems are extensively applied in various electronic products and cover functions in ever-increasing numbers. How to shorten system startup time so as to allow application functions to normally operate as quickly as possible is one of the goals for which manufacturers strive. To accelerate an operating system, a current approach is alternatively using a simple operating system or a lightweight operating system. However, a simple operating system lacks software function or hardware support, and a lightweight operating system is restricted by a structural design of the original operating system such that the startup time that can be reduced is rather limited.

SUMMARY OF THE INVENTION

Therefore, it is an object of the present invention to provide a system-on-chip operable on multiple operating systems in a time-division multiplexed manner, so as to overcome the issues of the prior art.

In one embodiment of the present invention, a processor control method is disclosed. The processor control method includes: controlling a processor to execute a first operating system in a first state; when the processor executing the first operating system satisfies a predetermined condition, controlling the processor to switch from the first state to a second state; and controlling the processor to execute a second operating system in the second state, wherein an authority of the first state is higher than an authority of the second state.

In one embodiment of the present invention, a processor control method is disclosed. The processor control method includes: controlling a processor to execute an operating procedure in a first state; when the processor executing the operating procedure satisfies a predetermined condition, controlling the processor to switch from the first state to a second state; and controlling the processor to execute an operating system in the second state, wherein an authority of the first state is higher than an authority of the second state.

In one embodiment of the present invention, a system-on-chip is disclosed. The system-on-chip includes a processor configured to execute a first operating system in a first state and to execute a second operating system in a second state. When the processor executing the first operating system satisfies a predetermined condition, the processor switches from the first state to a second state, wherein an authority of the first state is higher than an authority of the second state.

BRIEF DESCRIPTION OF THE DRAWINGS

To better describe the technical solution of the embodiments of the present invention, drawings involved in the description of the embodiments are introduced below. It is apparent that, the drawings in the description below represent merely some embodiments of the present invention, and other drawings apart from these drawings may also be obtained by a person skilled in the art without involving inventive skills.

DETAILED DESCRIPTION OF THE INVENTION

Figure 1:
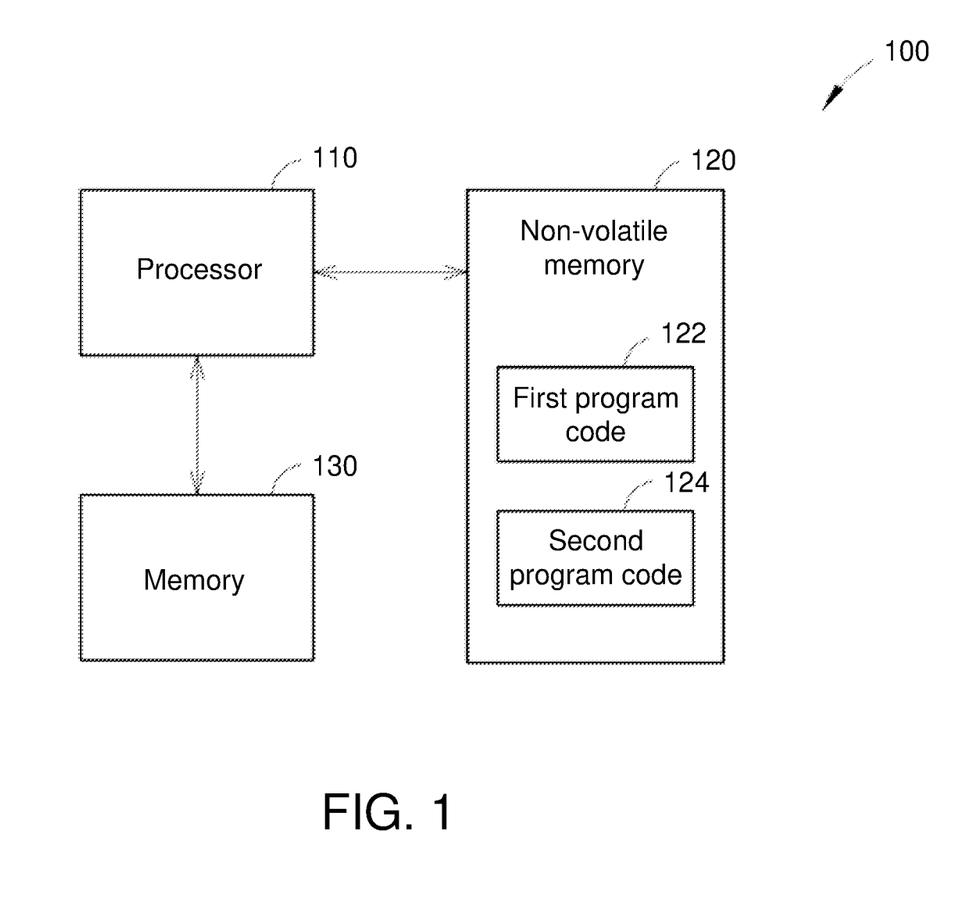
FIG. 1 is a schematic diagram of a system according to an embodiment of the present invention.

FIG. 1 shows a schematic diagram of a system 100 according to an embodiment of the present invention. As shown in FIG. 1, the system 100 includes a processor 110, a non-volatile memory 120 and a memory 130. The non-volatile memory 120 stores a first program code 122 and a second program code 124. In this embodiment, the non-volatile memory 120 may be a read-only memory (ROM) or a flash memory, the memory 130 may be a static random access memory (SRAM) or a dynamic random access memory (DRAM), the first program code 122 is a program code of a first operating system, and the second program code 124 is a program code of a second operating system. The first operating system is a lightweight operating system, for example, a real-time operating system or an operating procedure, and the second operating system is an operating system with relatively complete functions, for example, a Linux, UNIX, Android or Windows operating system. In this embodiment, the processor 110 is arranged in a system-on-chip, and the memory 130 and/or the non-volatile memory 120 may also be arranged in the system-on-chip. Moreover, the processor 110 itself is a single-core processor; if the system-on-chip is a dual-core processor, the processor 110 refers to one of the cores.

The processor 110 is designed to have multiple authority modes and a state switching ability. Specifically, the processor 110 is operable in one of a first state and a second state. For example, the processor 110 may be in the first state or the second state based on a time-division multiplexing design, wherein an authority of the first state is higher than an authority of the second state. More specifically, some predetermined resources of a system (for example, accessing predetermined memory sections or predetermined peripheral hardware) can be accessed only when the processor 110 operates in the first state. In one embodiment, the first state is a safe mode of the processor 110, and the second state is a non-safe mode of the processor 110. When the processor 110 is in the first state or the second state, the processor 110 has different authority modes therein, for example, a high authority mode and a low authority mode that are used to execute different programs. In one embodiment, the processor 110 further has a temporary state that is a super-high authority mode for switching the first state and the second state. The temporary state is set to be only used for switching the state of the processor, and merely the processor in the super-high authority mode of the temporary state has the ability of switching the state of the processor. In another embodiment, the first state and the second state of the processor 110 may be switched directly without going through a temporary state (not shown).

Figure 2:
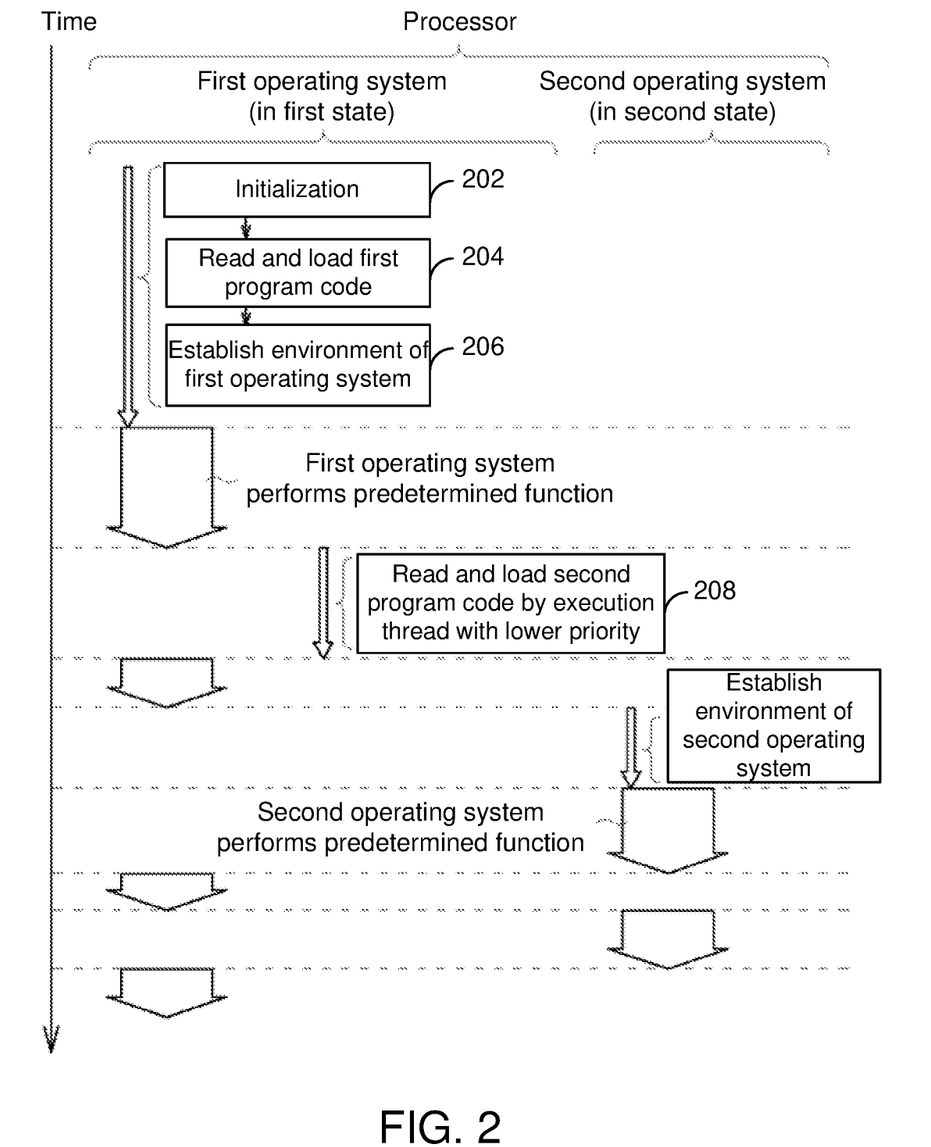
FIG. 2 is an operation flowchart of a system after power-on according to an embodiment of the present invention.

In this embodiment, the processor 110 is capable of executing the first operating system or the second operating system in different states based on a time-division multiplexing design that switches to different states with different authorities. For example, the processor 110 executes the first operating system in the first state, and executes the second operating system in the second state, wherein the authority of the first state is higher than the authority of the second state, so that the system 100 is allowed to adopt an appropriate operating system to enhance efficiency of the system 100. Specifically, refer to FIG. 2 showing an operation flowchart of the system 100 after power-on according to an embodiment of the present invention. After power-on or wake-up from a sleep mode of the system 100, in step 202, the processor 110 starts an initialization operation, for example, performing an initialization operation on the non-volatile memory 120 and the memory 130. In step 204, the processor 110 reads the first program code 122 from the non-volatile memory 120, and loads the first program code 122 to the memory 130. In step 206, the processor 110 executes the first program code 122 and establishes an environment of the first operating system, for example, controlling the processor 110 to execute the first operating system in the first state, and setting a state switching process of the processor 110, for example, an interrupt condition and a switching process of state switching. In one embodiment, the state switching may include two types. In one of the two types, the right of use for the processor is initiatively yielded, and this type is based on the content of the program code. The other type is triggered by a system interrupt, and is set in the first state (high authority) at the time of boot, during which it is determined which interrupts lead to the first state and which interrupt lead to the second state—such setting in this level cannot be performed in the second state. In addition, after the establishing of the environment of the first operating system is completed in step 206, based on a time-division multiplexing design, the processor 110 executes the first operating system or applications thereof in the first state.

While the processor 110 executes the first operating system or applications thereof, the processor 110 may perform step 208 under certain conditions. For example, the processor 110 may perform step 208 when the first operating system is idle, allowing the processor 110 in the first state to read the second program code 124 from the non-volatile memory 120 in the form of an execution thread with a lower priority, and load the second program code 124 to the memory 130. Next, in step 210, the processor 110 switches from the first state to the second state, starts to execute the second program code 124, establishes an environment of the second operating system, and starts an application based on the system, so as to execute the second operating system or applications thereof based on the time-division multiplexing design in the second state.

In the embodiment in FIG. 2, since the first operating system which is lightweight is first adopted after power-on of the system 100, initialization can quickly performed and associated programs can be executed. Moreover, based on the time-division multiplexing design of different authorities, the processor 110 is allowed to switch from the first state to the second state during a part of the time to execute the second operating system with relatively complete functions, providing the system 100 with more functions.

Figure 3A:
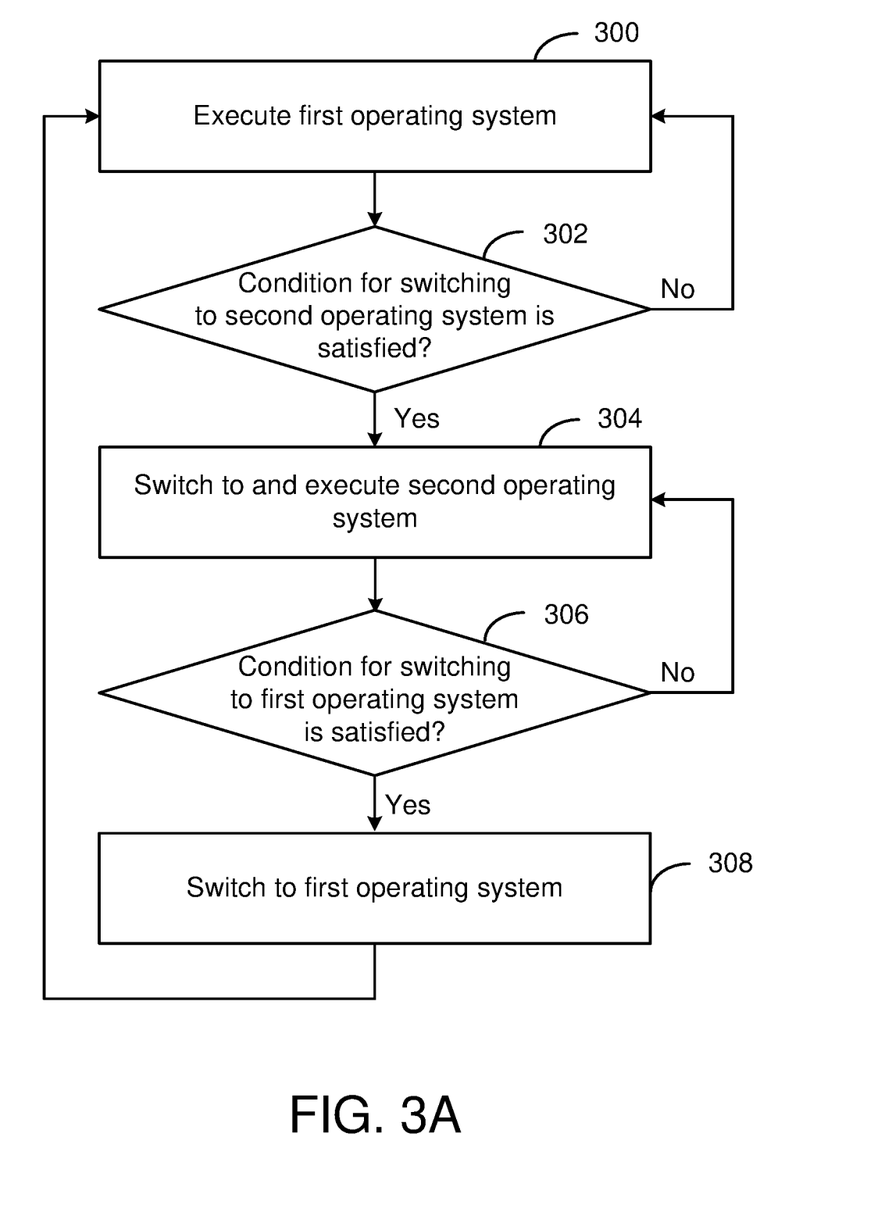
FIG. 3A is a schematic diagram of status switching of a processor according to an embodiment of the present invention.

FIG. 3A shows a schematic diagram of status switching of the processor 110 according to an embodiment of the present invention. In step 300, the processor 110 is in the first state and executes the first operating system. In step 302, the processor 110 determines whether one or more conditions for switching to the second operating system are satisfied, and the process proceeds to step 304 if so, otherwise the process returns to step 300. In this embodiment, satisfying the one or more conditions for switching to the second operating system may be that, the first operating system is in an idle state or is about to enter an idle state, or an operation time of the first operating system has reached a predetermined period. In step 304, the processor 110 first switches to the super-high authority mode of the temporary state so as to switch the first state to the second state, and starts to execute the second operating system in the second state. In step 306, the processor 110 determines whether one or more conditions for switching to the first operating system are satisfied, and the process proceeds to step 308 if so, otherwise the process returns to step 304. In this embodiment, satisfying the one or more conditions for switching to the first operating system may be receiving a hardware interrupt signal that needs to be processed by the first operating system, for example, an image sensor having received image data, an image signal processor having finished processing an image, or an image encoder having finished encoding an image, or the second operating system initiatively issuing a software interrupt request to request the first operating system to process certain functions. In step 308, the processor 110 first switches to the super-high authority mode of the temporary state so as to switch the second state to the first state, and the process returns to step 300.

Figure 3B:
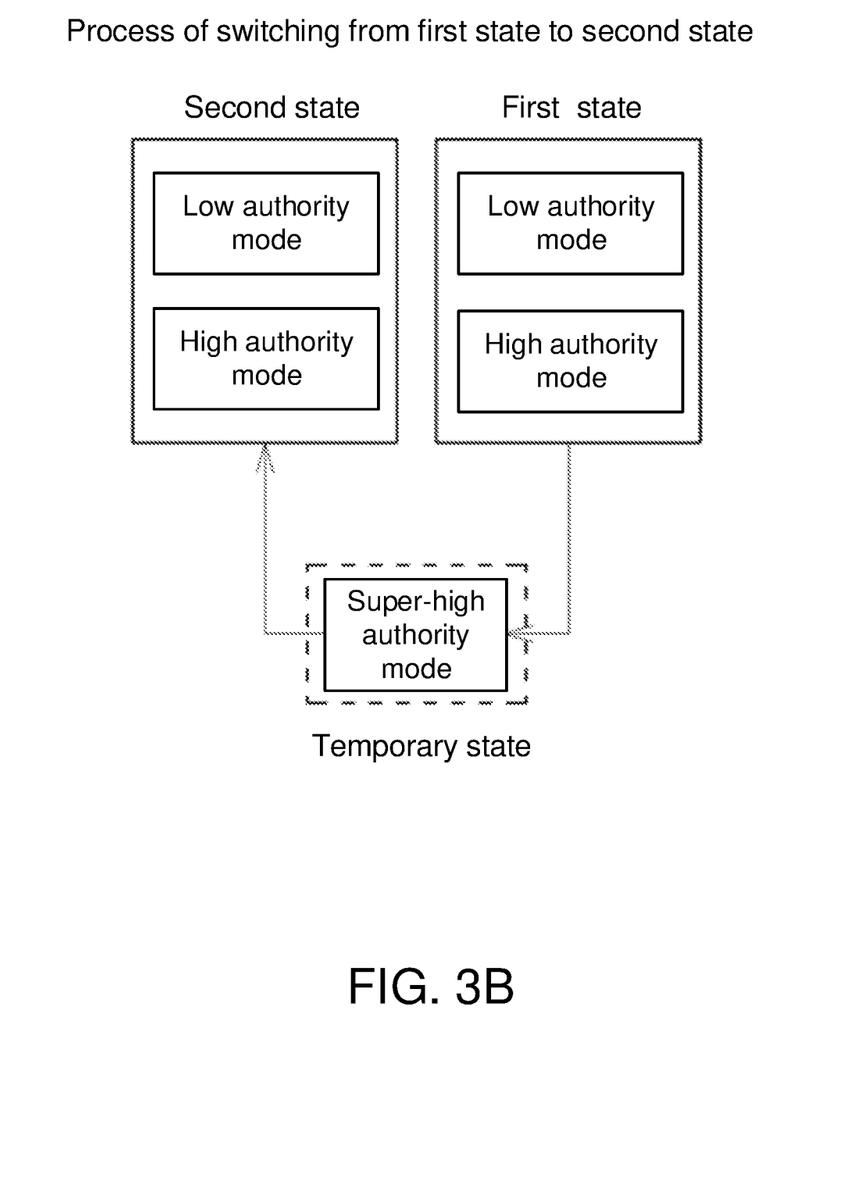
FIG. 3B is a schematic diagram of switching from a first state to a second state according to an embodiment of the present invention.

FIG. 3B shows a schematic diagram of switching from a first state to a second state according to an embodiment of the present invention. As shown in FIG. 3B, when the processor 110 determines that the one or more conditions for switching to the second operating system are satisfied, the processor 110 may first switch to the super-high authority mode of the temporary state in response to a predetermined instruction in any mode in the first state (for example, a low authority mode or a high authority mode). Once the processor 110 switches to the super-high authority mode of the temporary state, the processor 110 in the super-high authority mode stores the content of the current first state to the memory 130, and restores the content of the processor 110 in the second state previously stored in the memory 130 back to the processor 110. Next, the processor 110 switches from the super-high authority mode of the temporary state to the second state, and continues the operation at the time when the processor 110 was previously in the second state.

Figure 3C:
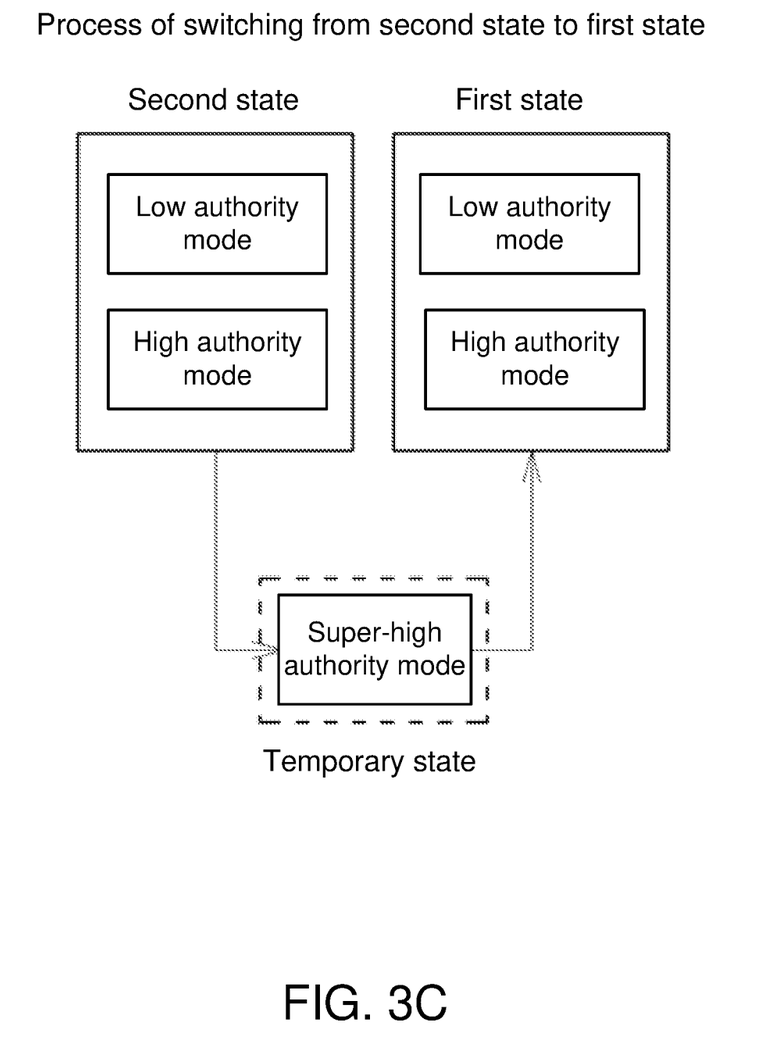
FIG. 3C is a schematic diagram of switching from a second state to a first state according to an embodiment of the present invention.

FIG. 3C shows a schematic diagram of switching from a second state to a first state according to an embodiment of the present invention. As shown in FIG. 3C, when the processor 110 determines that the one or more conditions for switching to the first operating system are satisfied, the processor 110 may first switch to the super-high authority mode of the temporary state in response to a predetermined instruction in any mode in the second state (for example, a low authority mode or a high authority mode). Once the processor 110 switches to the super-high authority mode of the temporary state, the processor 110 in the super-high authority mode stores the content of the current second state to the memory 130, and restores the content of the processor 110 in the first state previously stored in the memory 130 back to the processor 110. Next, the processor 110 switches from the super-high authority mode of the temporary state to the first state, and continues the operation at the time when the processor 110 was previously in the first state.

Figure 4A:
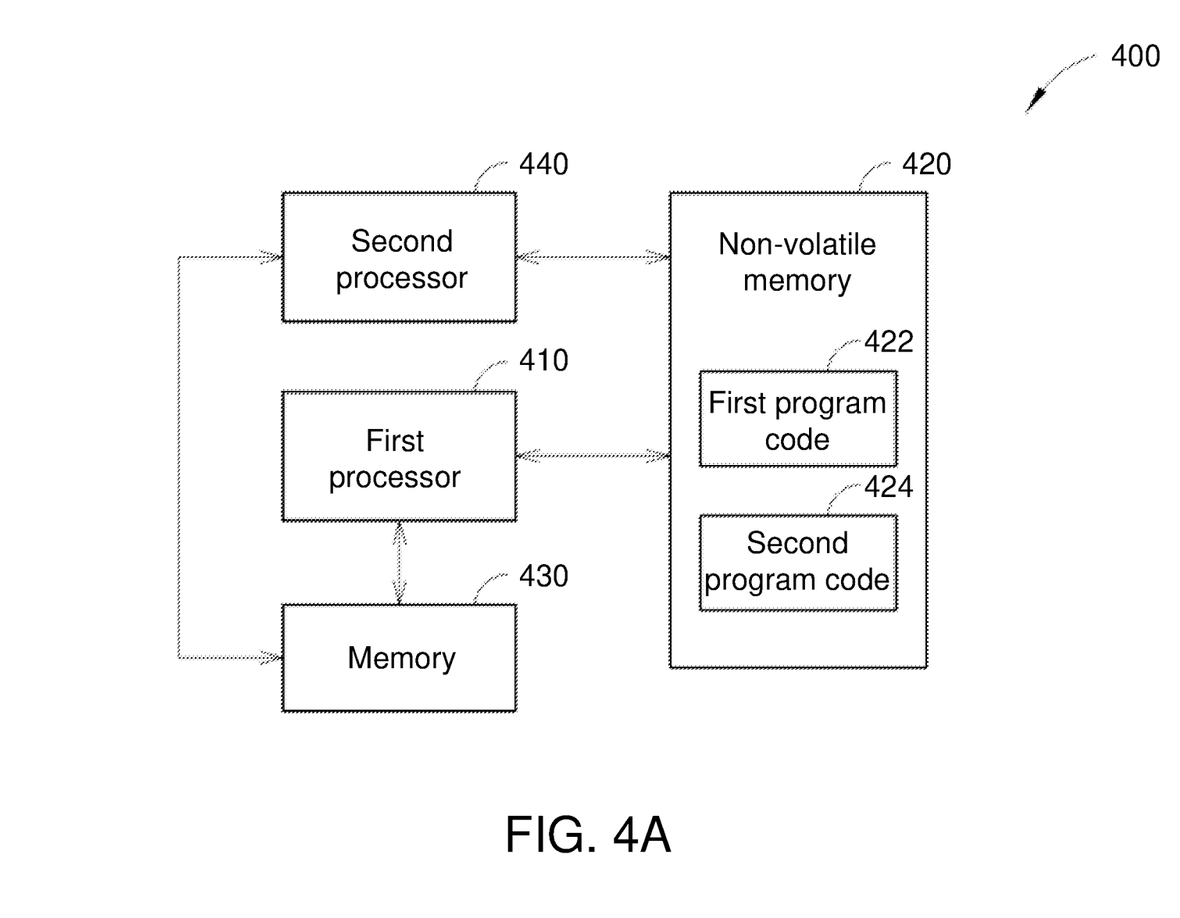
FIG. 4A is a schematic diagram of a system according to another embodiment of the present invention.

FIG. 4A shows a schematic diagram of a system 400 according to another embodiment of the present invention. As shown in FIG. 4A, the system 400 includes a first processor 410, a non-volatile memory 420, a memory 430 and a second processor 440. The non-volatile memory 420 stores a first program code 422 and a second program code 424. In this embodiment, the non-volatile memory 420 may be a ROM or a flash memory, the memory 430 may be an SRAM or a DRAM, the first program code 422 is a program code of a first operating system, and the second program code 424 is a program code of a second operating system. The first operating system is a lightweight operating system, and the second operating system is an operating with relatively complete functions. In this embodiment, the first processor 410 and the second processor 420 may be different processors, or be two core circuits of a multi-core processor.

The operation details of the first processor 410 in FIG. 4A associated with the non-volatile memory 420 and the memory 430 are as those of the first processor 110 in FIG. 1, and are omitted herein. In this embodiment, the second processor 440 may have three different types of operations below. In the first example, as the first processor 410, the second processor 440 may switch to different states based on a time-division multiplexing design of different authorities to execute the first operating system or the second operating system; for example, the second processor 440 executes the first operating system in the first state and executes the second operating system in the second state. In the second example, the second processor 440 reads only the first program code to execute the first operating system and associated programs but does not execute the second operating system. In the third example, the second processor 440 reads only the second program code 424 to execute the second operating system and associated programs but does not execute the first operating system. Moreover, in one embodiment, while the first processor 410 executes the first operating system in the first state, the second processor 440 executes the second operating system in the second state; while the first processor 410 executes the second operating system in the second state, the second processor 440 executes the first operating system in the first state.

Figure 4B:
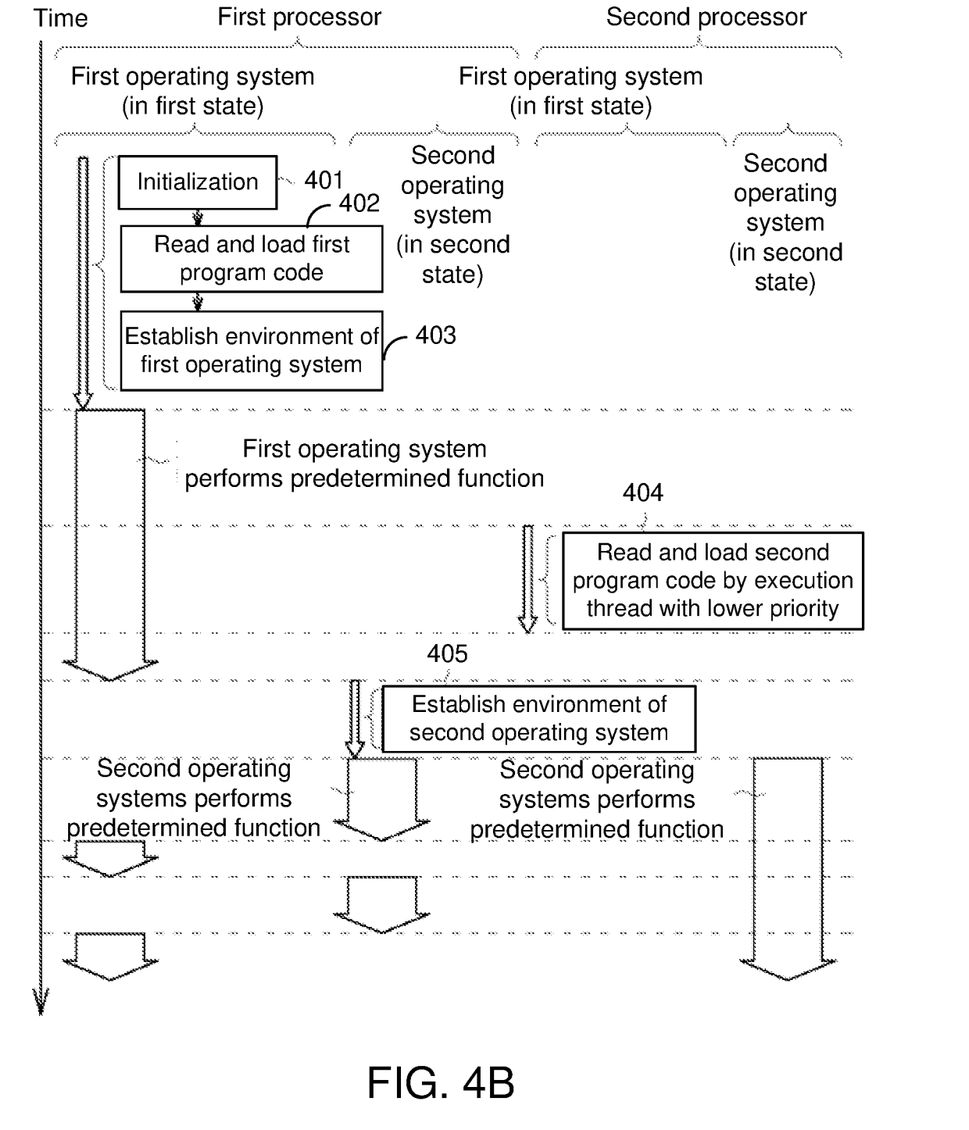
FIG. 4B is an operation flowchart of the system in FIG. 4 after power-on according to an embodiment of the present invention.

For example, refer to FIG. 4B showing an operation flowchart of the system 400 after power-on according to an embodiment of the present invention. After power-on or wake-up from a sleep mode of the system 400, in step 401, the first processor 410 starts an initialization operation, for example, performing an initialization operation on the non-volatile memory 420 and the memory 430. In step 402, the first processor 410 reads the first program code 422 from the non-volatile memory 420, and loads the first program code 422 to the memory 430. In step 403, the first processor 410 executes the first program code 422 and establishes an environment of the first operating system, for example, controlling the first processor 410 to execute the first operating system in the first state, and setting a state switching process of the first processor 410, for example, an interrupt condition and a switching process of state switching. In addition, after the establishing of the environment of the first operating system is completed in step 403, based on a time-division multiplexing design, the first processor 410 executes the first operating system or applications thereof in the first state.

While the first processor 410 executes the first operating system or applications thereof, in step 404, the second processor 420, in the first state, may read the second program code 424 from the non-volatile memory 420 in the form of an execution thread with a lower priority, and load the second program code 424 to the memory 430. Next, in step 405, the first processor 410 switches from the first state to the second state, starts to execute the second program code 424, and establishes an environment of the second operating system, so as to execute the second operating system or applications thereof based on the time-division multiplexing design in the second state. Similarly, the second processor 440 may also switch from the first state to the second state and start to execute the second program code 424, so as to execute the second operating system or applications thereof based on the time-division multiplexing design in the second state.

Figure 5:
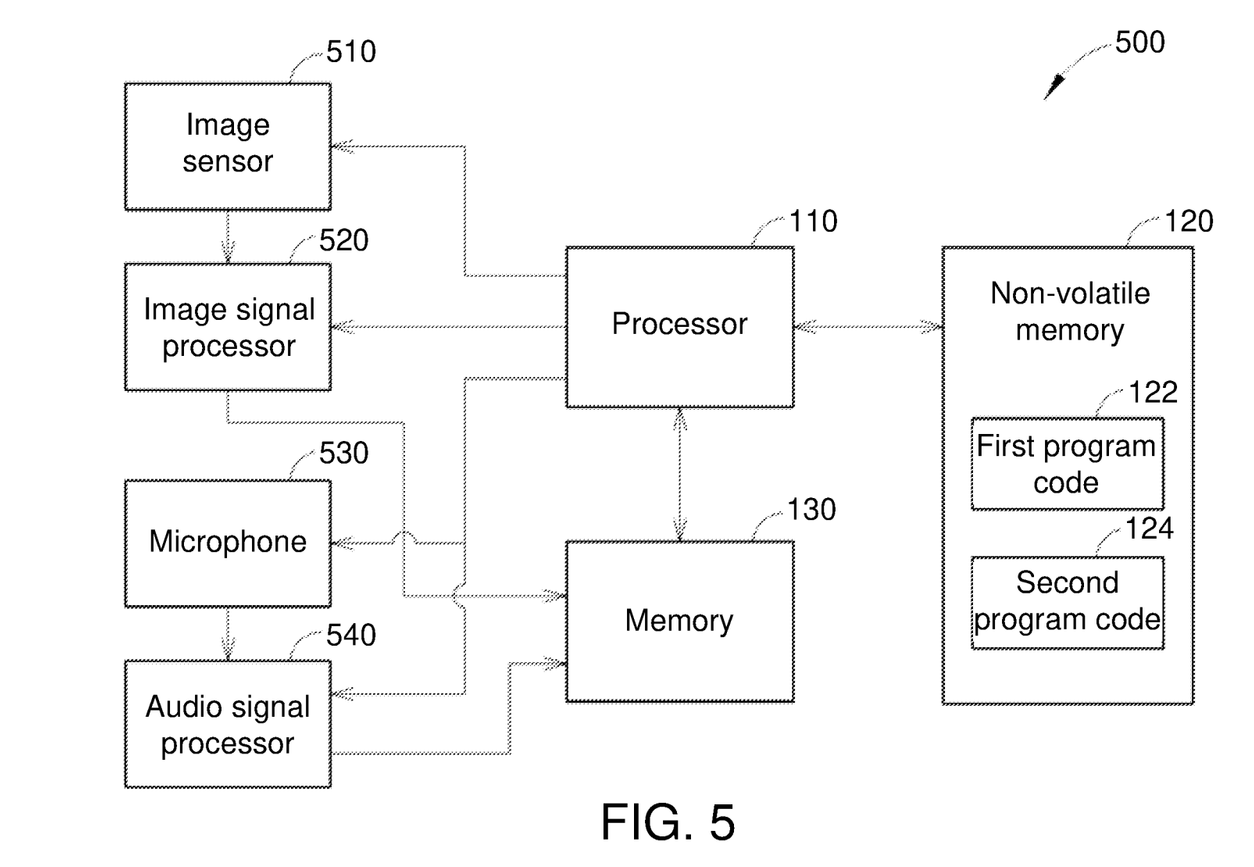
FIG. 5 is a schematic diagram of an electronic device according to an embodiment of the present invention.

In one embodiment, the system 100 in FIG. 1 may be applied to an image/audio capturing system, for example, a camera, cellphone, tablet computer and laptop computer capable of performing image and audio capturing. As shown in FIG. 5, an electronic device 500 includes a processor 110, a non-volatile memory 120, a memory 130, an image sensor 510, an image signal processor 520, a microphone 530 and an audio signal processor 540. The first program code 122 corresponding to the first operating system includes functions for initializing the image sensor 510, the image signal processor 520, the microphone 530 and the audio signal processor 540, as well as control procedures for which intervention needs to be provided by a processor during the continual operations of the four elements above. The second program code 124 corresponding to the second operating system includes functions for processing, file writing and transmitting (for example, network transmission) of video or audio data.

In the operation of the electronic device 500 in FIG. 5, after power-on of the electronic device 500, since the lightweight first operating system in the first state is capable of quickly completing associated operations such as initialization, the processor 110 is allowed to control the image sensor 510, the image signal processor 520, the microphone 530 and the audio signal processor 540 within an extremely short time, and to temporarily store the continually generated video data or audio data to the memory 130. Next, if the processor 110 enters an idle state while executing the first operating system, the processor 110 switches to the second state so as to execute the second operating system, and fetches the video or audio data from the memory 130 for subsequent processing such as processing, file writing or network transmission. Moreover, while the processor 110 executes the second operating system, if the image signal processor 520 or the audio signal processor 540 issues an interrupt notice, the processor 110 immediately switches to the first state according to the setting at the time of system startup so as to execute the first operating system to further perform an associated operation (for example, controlling the image signal processor 520 to output data to which position of the memory 130 when the image signal processor 520 performs a next operation, or calculating an image brightness level and controlling an exposure duration of the image sensor 510).

Figure 6:
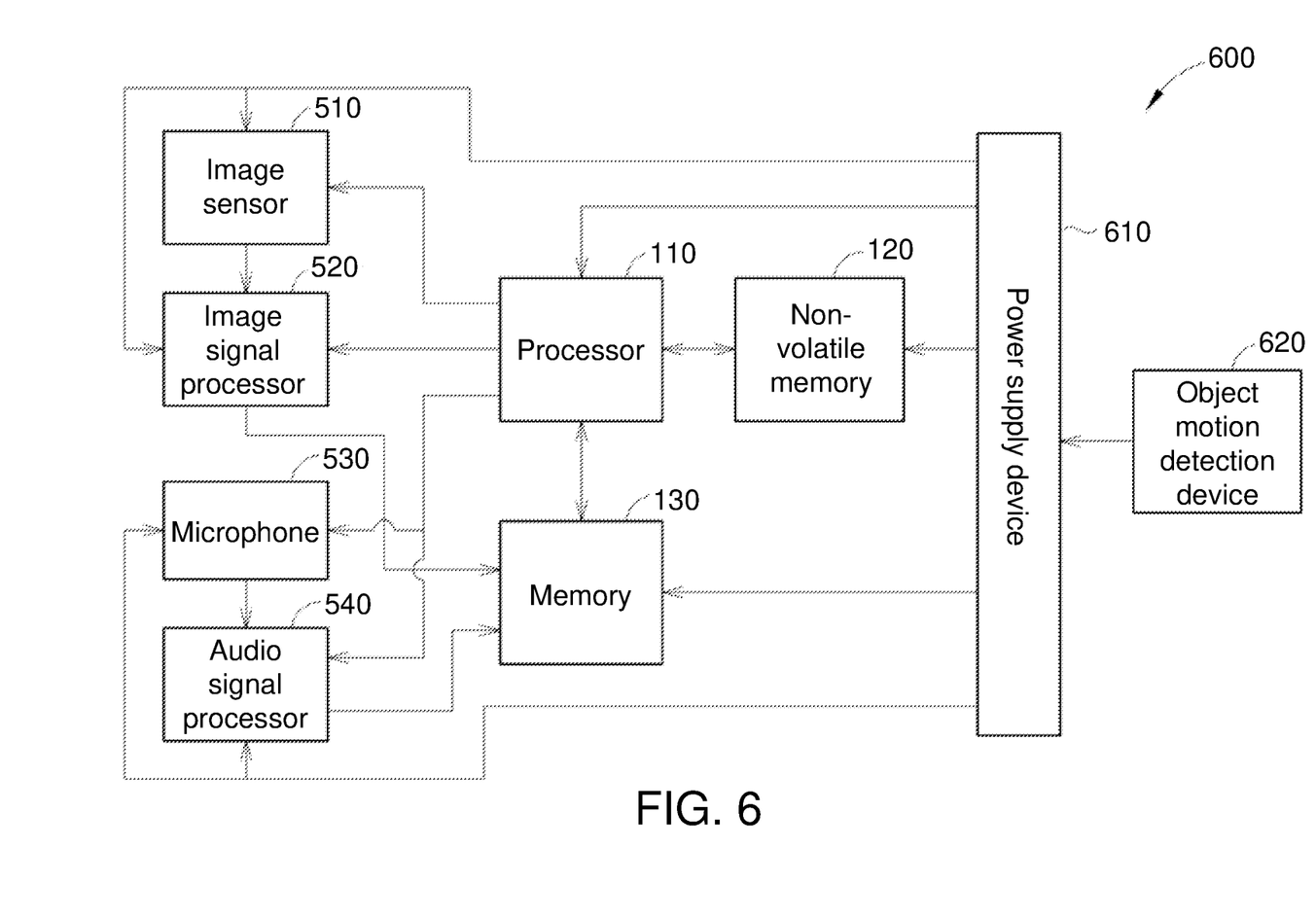
FIG. 6 is a schematic diagram of an electronic device according to an embodiment of the present invention.

FIG. 6 shows a schematic diagram of an electronic device 600 according to an embodiment of the present invention. As shown in FIG. 6, the electronic device 600 includes a processor 110, a non-volatile memory 120, a memory 130, an image sensor 510, an image signal processor 520, a microphone 530, an audio signal processor 540, a power supply device 610, and a detection device which exemplified by an object motion detection device 620 for illustration purposes in this embodiment. In this embodiment, the electronic device 600 is selectively operable in a normal mode or in a sleep mode according to a current operation state. When the electronic device 600 is in a sleep mode, the power supply device 610 temporarily stops supplying power to at least a part of the processor 110, the non-volatile memory 120, the memory 130, the image sensor 510, the image signal processor 520, the microphone 530 and the audio signal processor 540. At this point, the object motion detection device 620 is enabled and detects whether a motion of an object is present. If the object motion detection device 620 detects a motion of an object, it generates an instruction to trigger the power supply device 610 to start supplying power to related elements. Once the electronic device 600 is woken up, the operation process shown in the flowchart of FIG. 2 is performed, that is, the processor 110 is prioritized to operate in the first state and execute the first operation system.

It should be noted that, the object motion detection device 620 in FIG. 6 is merely an example and is not to be construed as a limitation to the present invention. In other embodiments, the object motion detection device 620 may be replaced by any mechanism capable of triggering a power supply operation.

In conclusion of the present invention, in the embodiments of the present invention, by adopting the lightweight first operating system after power-on of a system, initialization can be quickly performed and associated applications can be executed. Moreover, with the time-division multiplexing design, the processor is allowed to execute the second operating system with relatively complete functions when the first operating system is idle, providing the system support for more functions.

The description above provides merely preferred embodiments of the present application, and all variations and modifications made based on the range of claims of the present application are to be encompassed within the scope of the present application.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A processor control method, comprising:
   controlling a processor to execute a first operating system in a first state;
   when the processor executing the first operating system satisfies a predetermined condition, controlling the processor to switch from the first state to a second state, wherein when switching the processor from the first state to the second state, the processor is first switched to a temporary state with super-high authority; and
   controlling the processor to execute a second operating system in the second state, wherein an authority of the first state is higher than an authority of the second state.

2. The processor control method according to claim 1, wherein the first operating system is a real-time operating system.

3. The processor control method according to claim 1, wherein the predetermined condition is when the first operating system is idle.

4. The processor control method according to claim 1, wherein the processor executes the first operating system by means of reading a first program code and executes the second operating system by means of reading a second program code, and the processor is arranged in an electronic device; the method further comprising:
   after power-on of the electronic device, before reading the second program code to execute the second operating system, first reading the first program code to execute the first operating system.

5. The processor control method according to claim 1, wherein the processor is arranged in an electronic device comprising a camera, and the step of controlling the processor to execute the first operating system in the first state comprises:
   executing the first operating system to control an image sensor in the camera, and temporarily storing image data captured by the image sensor; and
   the step of controlling the processor to execute the second operating system in the second state comprises processing the image data and starting a network transmission function to transmit the processed image data.

6. The processor control method according to claim 1, wherein the processor is arranged in an electronic device; the processor control method further comprising:
   when the electronic device is in a sleep state, detecting whether the electronic device receives a power supply trigger operation; and
   if it is detected that the electronic device receives the power supply trigger operation, after power-on of the electronic device, controlling the processor to execute the first operating system in the first state.

7. The processor control method according to claim 6, wherein the power supply trigger operation is an object motion detection operation.

8. The processor control method according to claim 1, wherein the processor is a first processor; the processor control method further comprising:
   when the first processor executes the first operating system in the first state, controlling a second processor to execute the second operating system in the second state; and
   when the first processor executes the second operating system in the second state, controlling the second processor to execute the first operating system in the first state.

9. A system-on-chip, comprising:
   a processor, configured to execute a first operating system in a first state and to execute a second operating system in a second state;
   wherein, when the processor executing the first operating system satisfies a predetermined condition, the processor switches from the first state to a second state, wherein when switching the processor from the first state to the second state, the processor is first switched to a temporary state with super-high authority, and an authority of the first state is higher than an authority of the second state.

10. The system-on-chip according to claim 9, wherein the first operating system is a real-time operating system.

11. The system-on-chip according to claim 9, wherein the predetermined condition is when the first operating system is idle.

* * * * *